United States Patent [19]

Myers

[11] 4,259,865

[45] Apr. 7, 1981

[54] FLUID-GAUGING SYSTEMS

[75] Inventor: Ronald V. Myers, Basingstoke, United Kingdom

[73] Assignee: Smiths Industries Limited, London, England

[21] Appl. No.: 83,918

[22] Filed: Oct. 11, 1979

[30] Foreign Application Priority Data

Oct. 12, 1978 [GB] United Kingdom ............... 40350/78

[51] Int. Cl.³ .............................................. G01F 23/26
[52] U.S. Cl. .................................................. 73/304 C
[58] Field of Search ...................... 73/304 C; 331/109; 361/284

[56]  References Cited

U.S. PATENT DOCUMENTS

| 3,533,286 | 10/1970 | Westcott et al. | 73/304 C |
| 3,713,045 | 1/1973 | Usuda et al. | 331/109 |
| 3,916,689 | 11/1975 | Donnelly | 73/304 C |

Primary Examiner—Donald O. Woodiel
Attorney, Agent, or Firm—Pollock, Vande Sande & Priddy

[57]  ABSTRACT

A fuel-gauging system has a capacitive sensor that is mounted in a fuel tank and supplied with an alternating electric signal from an oscillator. The oscillator output is supplied to a diode-pump circuit that produces a D.C. voltage proportional to the product of the amplitude and the frequency of the oscillator output. The D.C. voltage is supplied to the input of a comparator that receives a constant voltage at its other input. The comparator produces a D.C. output voltage, dependent on the difference between its inputs, which is supplied to an input of the oscillator, the oscillator being arranged such that the amplitude of its output voltage is dependent upon the amplitude of the input voltage. In this way, the product of the amplitude and frequency of the oscillator output is maintained substantially constant. The system may have another capacitor located in the fuel tank to enable compensation for temperature changes, and a further capacitor of open construction immersed in the fuel, arranged to enable compensation for changes in permittivity of the fuel.

13 Claims, 4 Drawing Figures

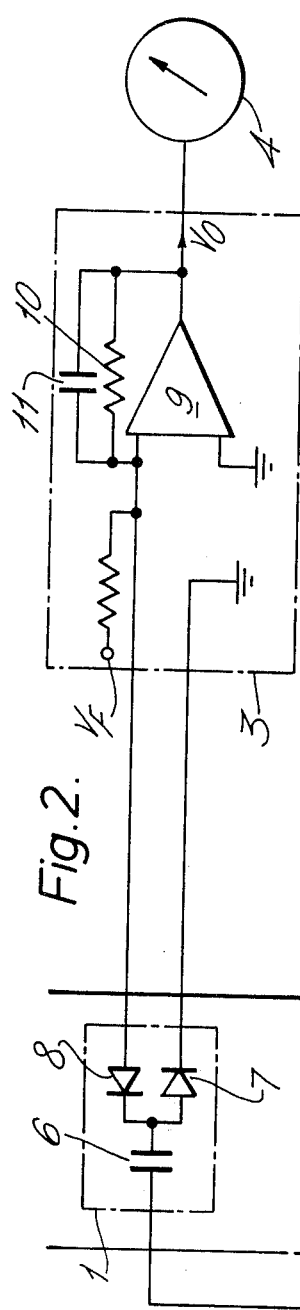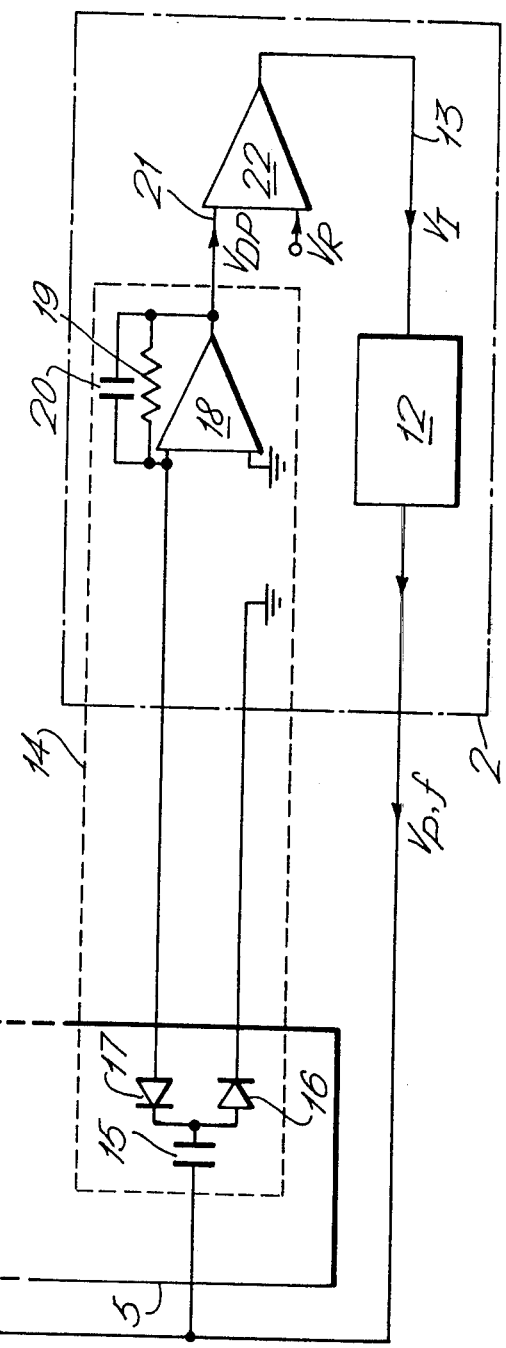
Fig.2.

FLUID-GAUGING SYSTEMS

BACKGROUND OF THE INVENTION

The invention relates to fluid-gauging systems and is particularly concerned with gauging systems for providing an indication of the quantity of fuel in a fuel tank and, more particularly, a fuel tank of an aircraft.

In previous fluid-gauging systems the level of fluid in a reservoir is determined by sensing changes in the value of a capacitor located within the container. The capacitor has two plates, separated by an air-cap which is filled or emptied as the level of fluid changes, thereby altering its capacitance. An alternating electric signal is supplied to the capacitor, and its output, which may be rectified, is supplied to a suitable measuring circuit.

Difficulties have been experienced in the past in providing an accurate indication of fluid quantity because of variations in the alternating signal supplied to the capacitor, temperature changes within the fluid reservoir, and variations in the permittivity of the fluid.

BRIEF SUMMARY OF THE INVENTION

It is an object of the present invention to provide a fluid-gauging system that may be used to alleviate the above-mentioned difficulties.

According to the present invention there is provided a fluid-gauging system including a capacitive sensor adapted for immersion within a fluid in a reservoir, and electrical supply means arranged to supply an alternating electric signal to the sensor such that the output of the sensor varies in accordance with change in fluid quantity, wherein the supply means includes means for modifying the amplitude of the alternating signal in response to changes in the frequency such that the product of the frequency and amplitude of the alternating signal is maintained substantially constant.

The electrical supply may include a diode pump circuit. The system may include a diode connected in series with the capacitive sensor, a second capacitor located within the reservoir, and a second diode connected in series with the second capacitor within the reservoir, the second capacitor and the second diode being connected in the system such that the output derived from the capacitive sensor in accordance with fluid quantity is compensated for changes in temperature with the reservoir. The system may include a permittivity sensor having a capacitor that is arranged to be filled by the fluid and that is connected in the system such that the output derived from the capacitive sensor is compensated for changes in the permittivity of the fluid.

A fluid-gauging system for providing an indication of the quantity of fuel within an aircraft fuel tank will now be described, by way of example, with reference to the accompanying drawings.

BRIEF DESCRIPTION OF THE DRAWINGS

FIG. 2 is a schematic diagram illustrating a modification of the gauging system of FIG. 1;

DETAILED DESCRIPTION

Figure 1:
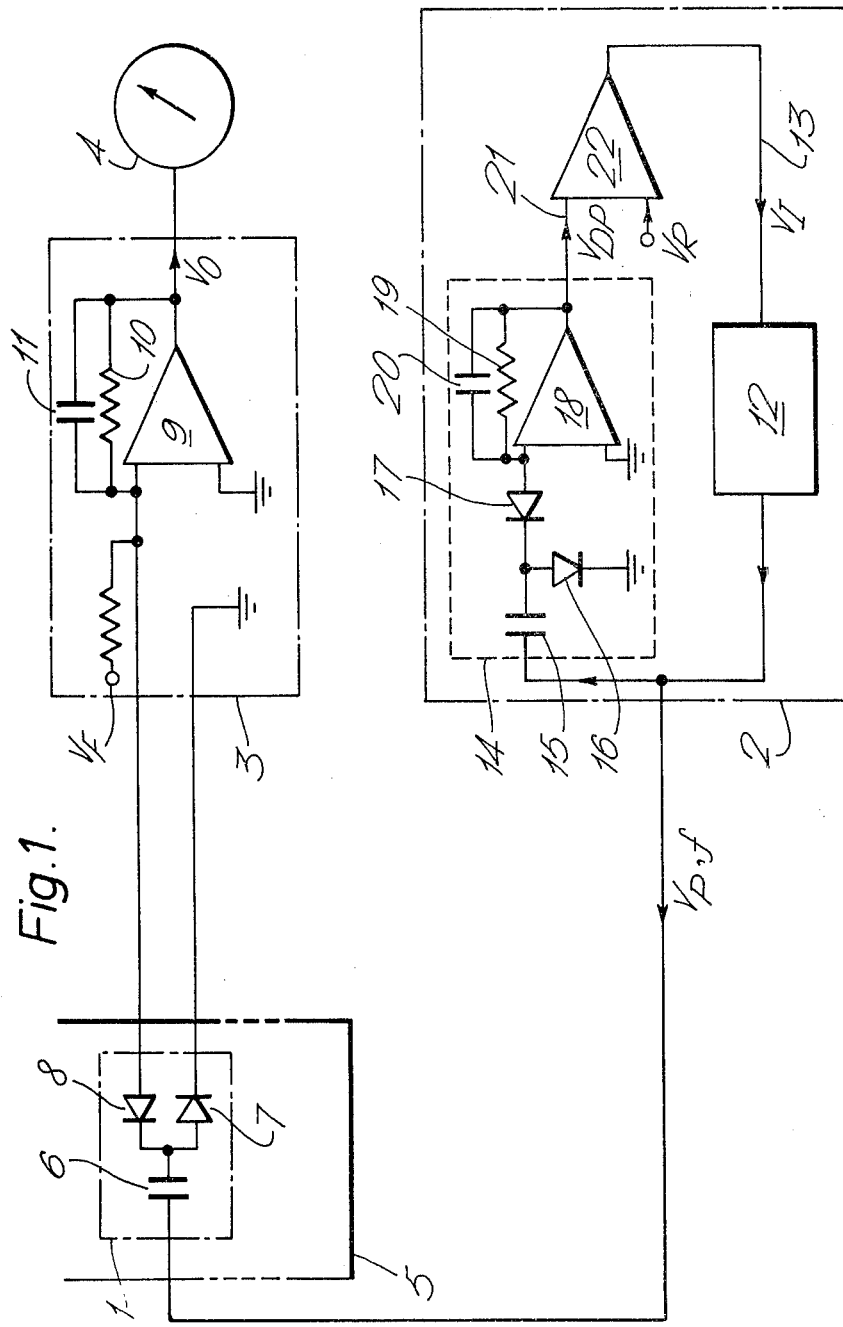
FIG. 1 is a schematic diagram of a fuel-gauging system.

With reference to FIG. 1, the fuel-gauging system includes a capacitive sensor unit 1, a supply unit 2 that provides an alternating signal to the sensor unit 1, and a detector unit 3 that provides a D.C. output voltage to an indicator 4 in accordance with changes in the output from the sensor unit 1.

The sensor unit 1 is mounted within an aircraft fuel tank 5 and includes a capacitor 6 which is positioned at a suitable location for immersion in any fuel present within the tank. The capacitor 6 may be of known form and have, for example, parallel plates or concentric tubes separated from one another by an air-gap which is filled with fuel to a height dependent on the fuel level within the tank 5. As the fuel level changes, the value of the capacitance correspondingly changes, and this change of capacitance is used to provide a measure of the fuel level.

The sensor unit 1 also includes two identical diodes 7 and 8, one diode 7 having its anode connected to a plate of the capacitor 6 and its cathode connected to earth, and the other diode 8 having its cathode connected to the same capacitor plate and its anode connected to the negative input of a current-to-voltage converter 9 within the detector unit 3. The detector unit 3 has a feedback resistance 10 and a capacitance 11 in parallel across the negative input of the converter 9. The positive input of the converter 9 is connected to earth.

A fixed positive voltage $V_F$ is also applied to the negative input of the converter 9, via a resistor. This voltage $V_F$ is adjusted such that the converter 9 gives a zero voltage output when the sensor capacitor 6 is clear of any fuel in the tank 5, that is, when the tank is "empty".

In general, the converter 9 provides a D.C. output voltage $V_o$ which is proportional to the value of the sensor capacitor 6 and which is given by the expression:

$$V_o = 2(V_P - V_D) f C_T R_T \qquad (I)$$

where
$V_P$ is the peak voltage supplied to the sensor unit 1 by the supply unit 2;
$V_D$ is the forward voltage drop across the sensor diode 7 or 8;
f is the frequency of the alternating voltage supplied to the sensor unit 1 by the supply unit 2;
$C_T$ is the capacitance of the sensor capacitor 6; and
$R_T$ is the resistance of the feedback resistor 10.

The output voltage $V_o$ will therefore be proportional to the capacitance $C_T$ of the sensor capacitor 6 in the fuel tank 5 provided that the product $(V_P - V_D)f$ is maintained constant. The supply unit 2, which is described below, has been arranged such that this voltage-frequency product is maintained constant.

The supply unit includes a sinewave oscillator 12, which has an output voltage of peak amplitude $V_P$ that is controlled by the magnitude of a D.C. voltage $V_I$ supplied to its input on line 13. The output of the oscillator 12 is supplied to the input of a diode pump circuit 14 which provides a D.C. output voltage $V_{DP}$ proportional to the product of the peak input voltage $V_P$ and its frequency f. The diode pump circuit 14 includes a reference capacitor 15 and two diodes 16 and 17 identical to the diodes 7 and 8 in the sensor unit 1. The first diode 16 has its anode connected to one plate of the capacitor 15 and its cathode connected to earth; the second diode 17 has its cathode connected to the same plate of the capacitor 15 and its anode connected to the negative input of a current-to-voltage converter 18. The current-to-voltage converter 18 has a feedback resistor 19 and capacitor 20 in parallel across it, and has its positive input connected to earth. The output voltage $V_{DP}$ of the diode pump circuit 14 is given by the expression:

$$V_{DP}=2(V_P-V_D)fC_RR_R \tag{II}$$

where $C_R$ is the capacitance of the reference capacitor 15 and $R_R$ is the resistance of the feedback resistor 19.

The output voltage $V_{DP}$ is supplied on line 21 to one input of a voltage comparator 22, the other input of which is supplied with a reference voltage $V_R$. The voltage comparator 22 provides the input voltage $V_I$ to the oscillator 12 and functions to keep the value of its two inputs, that is, $V_{DP}$ and $V_R$, the same. As the value of $V_{DP}$ falls below that of $V_R$, the output $V_I$ is correspondingly increased, thereby causing the voltage $V_P$ at the output of the oscillator 12 to be increased, thus raising the value of $V_{DP}$ until its becomes equal to $V_R$. It can be seen therefore that, since $V_{DP}$ is proportional to f and to the value of $(V_P-V_D)$, any change in the value of $V_P$ or f, caused, for example, by fluctuations in temperature of the oscillator 12, will cause a corresponding change in the value of $V_{DP}$, and that any such change will be compensated for by adjustment of the value of $V_P$. The voltage-frequency product $(V_P-V_D)f$ will therefore be maintained constant, and the output signal from the detector unit 3 will thus provide a measure of fuel level that is independent of fluctuation in frequency of the oscillator 12.

In the above description of the arrangement of FIG. 1 it was assumed that the value of the forward voltage drop $V_D$ was the same for the sensor diodes 7 and 8 as for the diodes 16 and 17 in the supply unit 2. Whilst this is a valid assumption where the temperature of the supply unit 2 and the sensor unit 1 is the same, or nearly so, and this temperature is maintained stable, it is desirable to provide compensation for changes in temperature and any difference in temperature between the two units that might occur during operation. Compensation for changes in temperature within the supply unit 2 may be readily achieved by adjustment of the reference voltage $V_R$ supplied to the voltage comparator 22 in accordance with a suitable temperature coefficient.

A modification of the system which provides compensation for temperature difference between the sensor unit 1 and supply unit 2 will now be described with reference to FIG. 2. The arrangement of FIG. 2 is identical to that of FIG. 1 except that the reference capacitor 15 and the diodes 16 and 17, originally contained within the supply unit 2, are now located within the fuel tank 5 alongside the sensor unit 1 and therefore at the same or substantially the same temperature. The forward voltage drop $V_D$ will therefore be the same for each diode, and the value of $V_P-V_D$ derived from the expression (II) may be substituted in the expression (I) to give:

$$V_o=V_RC_TR_T/C_RR_R \tag{III}$$

which is independent of the value of the diode forward voltage drop $V_D$.

Figure 3:
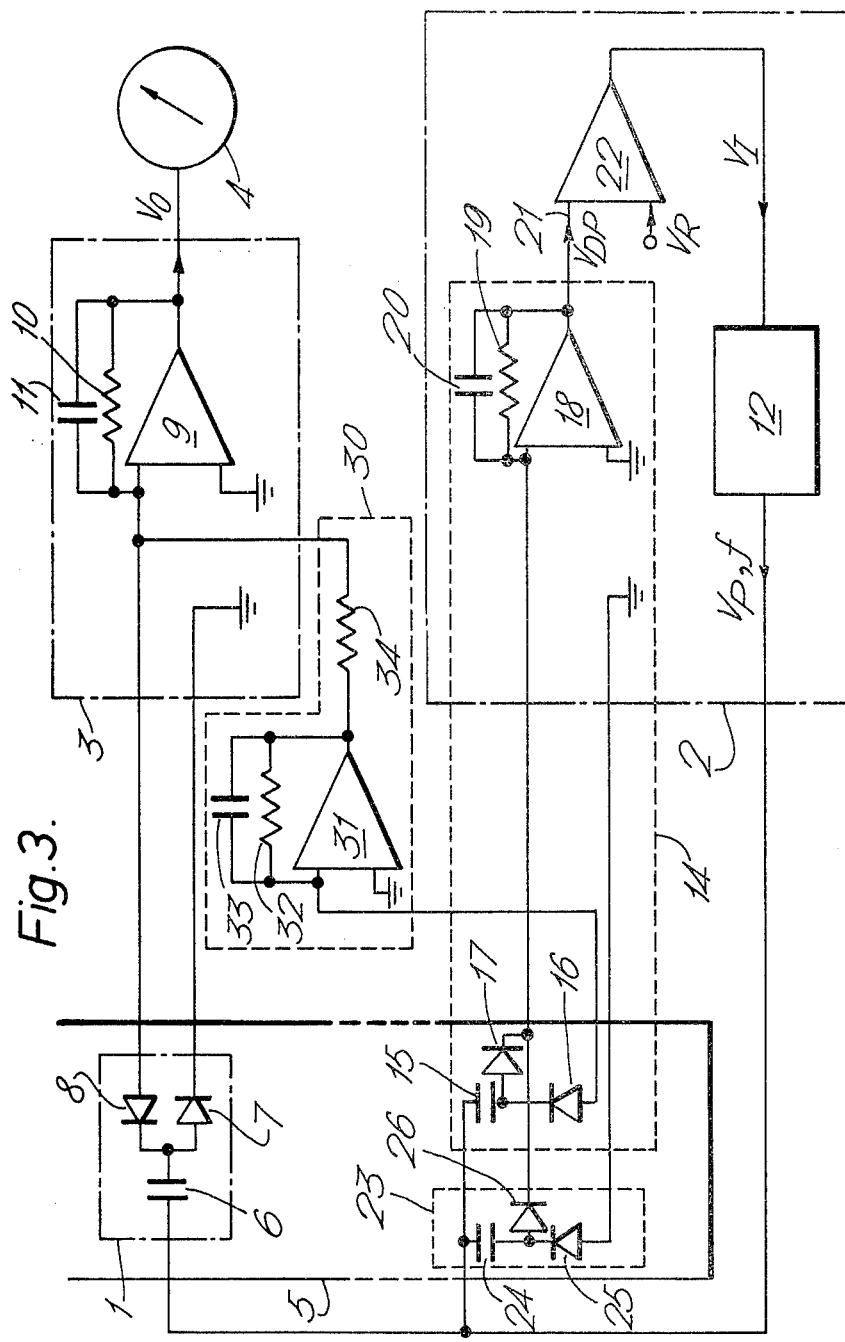
FIG. 3 is a schematic diagram illustrating a modification of the fuel-gauging system of FIG. 2.

The fuel-gauging system may be further modified, as shown in FIG. 3, such that it provides an indication of the mass of fuel that is compensated for changes in fuel permittivity. In this arrangement a permittivity cell 23 is connected in parallel with the reference capacitor 15 within the fuel tank 5. The cell 23 includes a capacitor 24 mounted at the bottom of the tank 5 so as to be fully immersed in the fuel at all times. The capacitor 24 is of open construction so that the fuel fills the gap between the capacitor plates and so that the capacitance $C_P$ of the capacitor 24 thereby changes in accordance with changes in the permittivity (K) of the fuel. The capacitance $C_P$ of the capacitor 24 is made to be equal to $0.4C_R$, with no fuel present, or $0.4KC_R$ with fuel, for reasons that will become apparent later. The cell 23 also includes two diodes 25 and 26, one diode 25 having its cathode connected to one plate of the capacitor 24 and its anode connected to earth, the other diode 26 having its anode connected to the same plate of the capacitor 24 and its cathode connected to the positive input of the current-to-voltage converter 18.

The difference between the capacitance $C_T$ of the sensor capacitor 6 when the tank is full and when it is empty, that is, when the capacitor plates are separated by fuel and when they are separated by air, is proportional to $K-1$. The sensor capacitor 6 is characterised to the shape of the fuel tank 5 such that there is a linear relationship between the volume of fuel in the tank and the capacitance of the sensor capacitor; this may be done in a known manner such as, for example, by suitably shaping the capacitor plates such that the area covered by the fuel varies in a non-linear manner with depth. It can be seen therefore that the value $C_T$ of the capacitor 6 for any particular volume (V) of fuel will be proportional to $(K-1)V$. By substituting in the expression (I) for $C_T$ gives:

$$V_o \propto 2(V_P-V_D)f(K-1)VR_T \tag{IV}$$

It has been found empirically that the relationship between fuel density (D) and permittivity (K) can be given approximately by the expression:

$$D \propto (K-1)/(1+0.4K) \tag{V}$$

and therefore that the mass (M) of fuel can be given by:

$$M \propto V(K-1)/(+0.4K) \tag{VI}$$

Since the capacitor 24 in the permittivity cell 23 is now connected in parallel with the reference capacitor 15, the expression (II) is modified to read as follows:

$$V_{DP}=2(V_P-V_D)f(C_R+C_P)R_R \tag{VII}$$

and therefore, since $V_{DP}$ is controlled to be equal to the reference voltage $V_R$, this gives:

$$(V_P-V_D)f=V_R/2(C_R+C_P)R_R \tag{VIII}$$

If the value of $(V_P-V_D)$ derived from (VIII) is substituted in the expression (IV) this gives:

$$V_o \propto V_R(K-1)VR_T/(C_R+C_P)R_R \tag{IX}$$

Since, from the expression (VI), $V(K-1)$ is proportional to $M(1+0.4K)$, when substituted in (IX) it gives:

$$V_o \propto M(1+0.4K)V_RR_T/(C_R+C_P)R_R \tag{X}$$

The value $C_P$ of the capacitor 24 in the permittivity cell 23 is equal to 0.4K times the value $C_R$ of the reference capacitor 15, or:

$$(C_R + C_P) = (1 + 0.4K)C_R \qquad (XI)$$

If this is substituted in the expression (X) it gives:

$$V_o \propto MV_R R_T / C_R R_R \qquad (XII)$$

The value of the output voltage $V_o$ is therefore proportional to the mass (M) of the fuel and is independent of its permittivity.

When the amount of fuel in the tank 5 becomes so low that no more fuel can be supplied to the aircraft engine the sensor capacitor 6 will be clear of any fuel that does remain and will therefore provide a nominally "empty" reading. There will still normally, however, be sufficient fuel to cover the capacitor 24 of the permittivity cell 23 since this is generally positioned at the bottom of the fuel tank 5. The value $C_P$ of the capacitor 24 will still therefore be susceptible to changes in permittivity of the fuel which will not influence the value $C_T$ of the sensor capacitor 6. These changes in permittivity may result in changes in the voltage $V_P$ and frequency f of the oscillator 12 which may in turn cause the output voltage $V_o$ from the converter 9 to vary. In order to ensure that the output voltage $V_o$ remains at zero when the tank 5 is "empty" a correction circuit 30 is included in the system to provide a positive correction voltage $V_c$ to the negative input of the converter 9 in place of the fixed voltage $V_F$ used in the arrangements shown in FIGS. 1 and 2.

The correction circuit 30 includes a current-to-voltage converter amplifier 31 having a feedback resistance 32, of value $R_B$, and a capacitance 33, of value $C_B$, in parallel between its output and its negative input. The circuit 30 also includes a resistor 34, of value $R_c$, connected to the output of the amplifier 31. The positive input of the amplifier 31 is connected to earth whereas its negative input is connected to the anode of the diode 16 in the diode-pump circuit 14. The output of the correction circuit 30 is connected to the negative input of the converter 9 in the detector unit 3, the output or correction voltage $V_c$ of the correction circuit being given by the expression:

$$V_c = 2(V_P - V_D) f C_B R_B / R_c \qquad (XIII)$$

The value $R_c$ of resistor 34 is adjusted such that the output $V_c$ of the correction circuit 30 is equal to the output from the sensor unit 1 when the sensor capacitor 6 is not immersed in fuel that is:

$$2(V_P - V_D) f C_T = 2(V_P - V_D) f C_B R_B / R_c \qquad (XIV)$$

or:

$$C_T = C_B R_B / R_c \qquad (XV)$$

It can be seen therefore that the expression (XV) above is independent of frequency, voltage and permittivity and that the output $V_o$ of the converter 9 will be unaffected by these factors and can thereby be maintained constant to give a zero reading of the indicator 4 when the fuel tank 5 is "empty".

Figure 4:
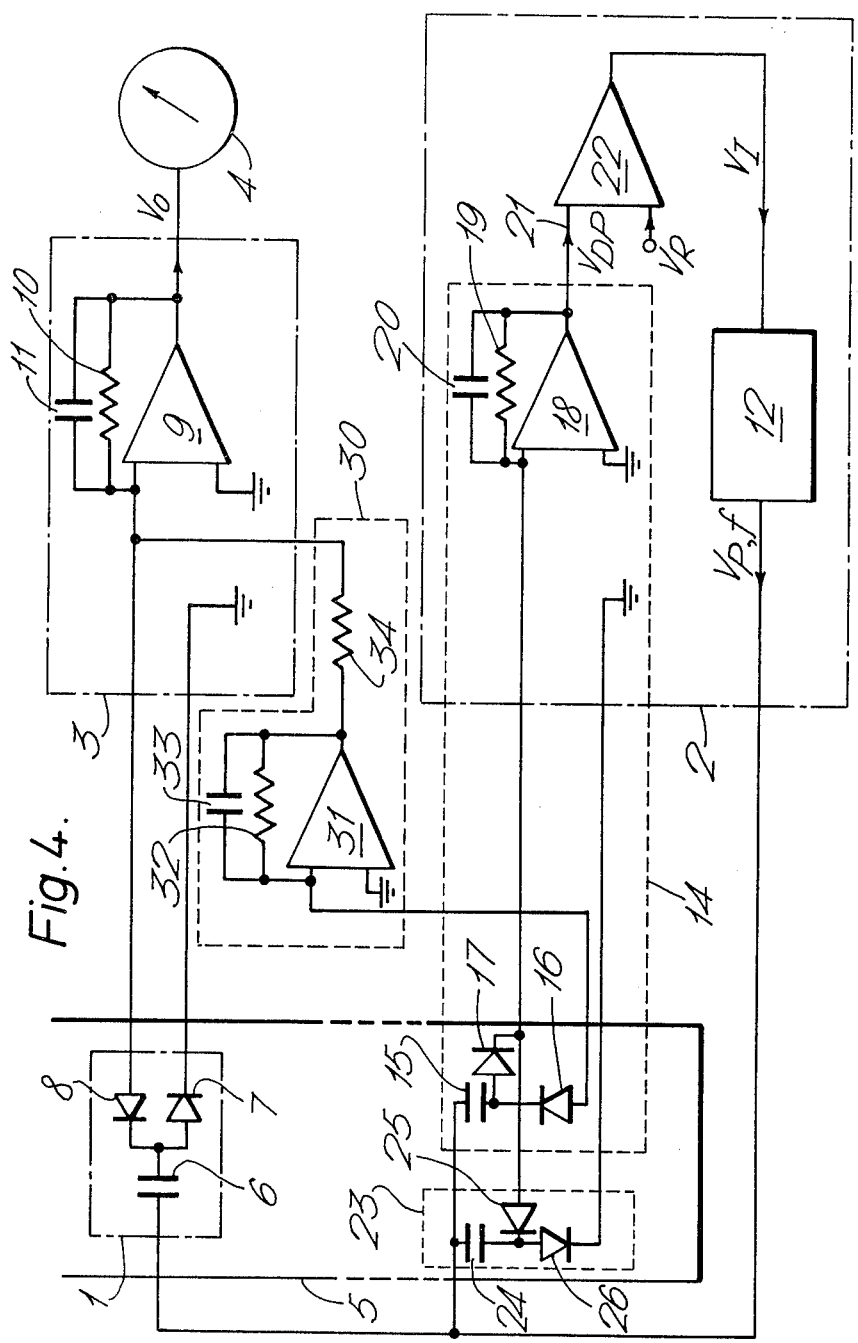
FIG. 4 is a schematic diagram illustrating a modification of the fuel-gauging system of FIG. 3.

A fuel-gauging system for providing an indication of the volume of fuel present, independent of permittivity is shown in FIG. 4. This system is similar to that shown in FIG. 3 except in the way in which the diodes 25 and 26 are arranged in the permittivity cell 23. In the arrangement shown in FIG. 4, the anode of diode 25 is connected to the cathode of diode 17 and to the negative input of the current-to-voltage converter 18. The cathode of diode 26 is connected to ground. The value $C_P$ of the capacitance 24, when there is no fuel between its plates, is chosen to be equal to the value $C_R$ of the reference capacitor 15, that is:

$$C_P = C_R \qquad (XVI)$$

Since the capacitor 24 is always immersed in fuel its value will in general be:

$$C_P = K C_R \qquad (XVII)$$

The output $V_{DP}$ of the converter 18, in this arrangement, is given by the expression:

$$V_{DP} = 2(V_P - V_D) f (C_P - C_R) R_R \qquad (XVIII)$$

substituting (XVII) in (XVIII) gives:

$$V_{DP} = 2(V_P - V_D) f C_R (K - 1) R_R \qquad (XIX)$$

The output $V_{DP}$ of the converter 18 is controlled by the oscillator 12 to be equal to $V_R$, as mentioned earlier. Substituting $V_R$ for $V_{DP}$ and rearranging (XIX) gives:

$$2(V_P - V_D) f (K - 1) = V_R / C_R R_R \qquad (XX)$$

The output $V_o$ of the converter 9 is given by the expression (IV) earlier, and substituting (XX) in this gives:

$$V_o \propto V R_T V_R / C_R R_R \qquad (XXI)$$

where V is the volume of fuel.

It can be seen therefore that the output $V_o$ is proportional to the volume of fuel and is independent of its permittivity.

I claim:

1. A fluid-gauging system of the kind including a capacitive sensor adapted for immersion within a fluid in a reservoir, and electrical supply means connected to supply an alternating electric signal to said sensor such that the output of said sensor thereby varies in accordance with change in fluid quantity, the improvement wherein said supply means includes means for modifying the amplitude of the alternating signal supplied to said sensor in response to changes in the frequency of the signal in a manner such that the product of the frequency and amplitude of the signal supplied to said sensor is maintained substantially constant.

2. A fluid-gauging system according to claim 1, wherein said supply means includes electrical oscillator means providing said alternating electric signal, circuit means supplying a D.C. signal to an input of said oscillator means, the amplitude of said alternating signal from said oscillator means being dependent upon the amplitude of the D.C. signal at said input of the oscillator means.

3. A fluid-gauging system according to claim 2, wherein said circuit means includes a diode pump circuit, means supplying an alternating signal to an input of said diode pump circuit such that said diode pump circuit thereby produces a D.C. output the amplitude of which is dependent upon the product of the amplitude and frequency of the signal supplied to the input of said diode pump circuit.

4. A fluid-gauging system according to claim 2, wherein said circuit means includes comparator means having two inputs, said comparator means being connected to control, in response to any difference in the signal amplitudes at the two inputs of said comparator means, the amplitude of said D.C. signal supplied to the input of said oscillator means.

5. A fluid-gauging system according to claim 4, including a source of substantially constant amplitude connected to supply said substantially constant signal to one output of said comparator means.

6. A fluid-gauging system according to claim 5 including a diode pump circuit, means supplying an alternating signal to an input of said diode pump circuit such that said diode pump circuit thereby produces a D.C. output the amplitude of which is dependent upon the product of the amplitude and frequency of the signal supplied to the input of said diode pump circuit, and means supplying the output of said diode pump circuit to the other input of said comparator means.

7. A fluid-gauging system comprising a capacitive sensor for immersion within fluid in a reservoir; electrical supply means; and means for supplying an alternating electric output signal from said supply means to said capacitive sensor such that the output of said sensor thereby varies in accordance with change in fluid quantity, the said supply means including: electrical oscillator means providing said alternating output signal, a diode pump circuit, means supplying said alternating output signal from said oscillator means to said diode pump circuit such that said diode pump circuit thereby produces a D.C. output signal the amplitude of which is dependent upon the product of the amplitude and frequency of the output signal from said oscillator means, comparator means having two inputs, means connecting one of the inputs of said comparator means to receive said D.C. output signal from said diode pump circuit, means connecting the other of the inputs of said comparator means to receive a substantially constant amplitude such that said comparator means thereby produces a D.C. output the amplitude of which varies in accordance with any difference in the signal amplitudes at the two inputs of the comparator means, and means for supplying the D.C. output of said comparator means to an input of said electrical oscillator, the amplitude of said alternating output signal from said oscillator means being dependent upon the amplitude of the D.C. signal at the input of said oscillator such that the product of the frequency and amplitude of the said alternating output signal from said oscillator means is thereby maintained substantially constant.

8. A fluid-gauging system according to any one of the preceding claims, including a first unidirectional current device and means connecting said first device in series with said capacitive sensor, and wherein said supply means includes a second capacitor, a second unidirectional current device, means connecting said second capacitor in series with said second unidirectional current device, means mounting said second capacitor and said second unidirectional current device in said reservoir such that the output derived from the said capacitive sensor is thereby compensated for change in temperature within the reservoir.

9. A fluid-gauging system according to any one of claims 1 to 7 including a permittivity sensor having a capacitor of open-construction, means mounting the permittivity sensor in said reservoir such that said capacitor of open-construction is filled by fluid in said reservoir, and means connecting said permittivity sensor in said system such that the output derived from said capacitive sensor is thereby compensated for change in the permittivity of the fluid.

10. A fluid-gauging system according to claim 8, wherein said system includes a permittivity sensor having a capacitor of open-construction and second and third unidirectional current devices connected to one electrode of said capacitor of open-construction, means mounting the permittivity sensor in said reservoir such that said capacitor of open-construction is filled by fluid in said reservoir, and means connecting said permittivity sensor in said system such that the output derived from said capacitive sensor is thereby compensated for change in the permittivity of the fluid.

11. A fluid-gauging system according to claim 10, wherein one of said second or third unidirectional current devices has an electrode connected to the same electrode of the other of said second or third unidirectional current devices.

12. A fluid-gauging system according to claim 10, wherein one of said second or third unidirectional current devices has an electrode connected to the opposite electrode of the other of said second or third unidirectional current devices.

13. A fluid-gauging system according to claim 1 wherein the system includes a correction circuit, means connecting said correction circuit in said system such that said correction circuit supplies signals in opposition to the output of said capacitive sensor so as thereby to compensate for any changes in permittivity of said fluid that affect said permittivity sensor without affecting said capacitive sensor.

* * * * *